(12) United States Patent
Ross et al.

(10) Patent No.: US 12,377,577 B2
(45) Date of Patent: Aug. 5, 2025

(54) CONSTRUCTION APPARATUSES AND METHODS OF USE THEREOF

(71) Applicant: Onsite ICF, LLC, Pittsburgh, PA (US)

(72) Inventors: Steven L. Ross, Pittsburgh, PA (US); Drew Degentesh, Pittsburgh, PA (US)

(73) Assignee: Onsite ICF, LLC, Pittsburgh, PA (US)

( * ) Notice: Subject to any disclaimer, the term of this patent is extended or adjusted under 35 U.S.C. 154(b) by 960 days.

(21) Appl. No.: 17/505,724

(22) Filed: Oct. 20, 2021

(65) Prior Publication Data

US 2022/0118648 A1 Apr. 21, 2022

Related U.S. Application Data

(60) Provisional application No. 63/094,115, filed on Oct. 20, 2020.

(51) Int. Cl.
| | |
|---|---|
| *B28B 7/00* | (2006.01) |
| *B28B 1/50* | (2006.01) |
| *B28B 7/28* | (2006.01) |

(52) U.S. Cl.
CPC ............ *B28B 7/0038* (2013.01); *B28B 1/503* (2013.01); *B28B 7/28* (2013.01); *B28B 2007/0047* (2013.01)

(58) Field of Classification Search
CPC . B28B 7/0029; B28B 7/0038; B28B 7/16162; B28B 7/18; B28B 7/183; B29L 2031/10
See application file for complete search history.

(56) References Cited

U.S. PATENT DOCUMENTS 720,536 A * 2/1903 Seamans
799,611 A * 9/1905 Miller
(Continued)

FOREIGN PATENT DOCUMENTS

| WO | 91/10546 A1 | 7/1991 |
| WO | 2018/187801 A1 | 10/2018 |

OTHER PUBLICATIONS

International Preliminary Report On Patentability for Corresponding International Application No. PCT/US2021/055715 mailed Mar. 13, 2023, 11 pages.
(Continued)

*Primary Examiner* — Jessica L Laux
(74) *Attorney, Agent, or Firm* — Dinsmore & Shohl LLP

(57) ABSTRACT

A construction apparatus for forming modular construction components is disclosed. The construction apparatus comprises a first shell piece and a second shell piece that define an interior chamber defining a space for receiving a moldable material. The construction apparatus further comprises a separation device to move the first shell piece and the second shell piece from a closed configuration to an open configuration. The construction apparatus further comprises one or more cores within the interior chamber, one or more pins extending within the interior chamber, and one or more retaining plates for retaining the pins on the first shell piece. The interior chamber may be filled with the moldable material in the closed configuration and the moldable material may be cured. The construction apparatus may be shifted to the open configuration by the separation device and the pins and retaining plates may be used to extract the molded block from the first shell piece and/or second shell piece.

18 Claims, 6 Drawing Sheets

(56) References Cited

U.S. PATENT DOCUMENTS

| | | | | | |
|---|---|---|---|---|---|
| 803,014 | A | * | 10/1905 | McIlravy | |
| 808,643 | A | * | 1/1906 | Eckley | |
| 1,702,253 | A | * | 2/1929 | Elliot | B28B 7/183 |
| | | | | | 249/146 |
| 4,389,036 | A | * | 6/1983 | Abou-Ezzeddine | |
| | | | | | B28B 7/0055 |
| | | | | | 249/142 |
| 4,566,668 | A | * | 1/1986 | Koppenberg | B28B 7/18 |
| | | | | | 249/176 |
| 2007/0245659 | A1 | * | 10/2007 | West | E04B 2/8623 |
| | | | | | 52/426 |
| 2018/0290332 | A1 | * | 10/2018 | Ross | B62B 3/02 |

OTHER PUBLICATIONS

International Search Report and Written Opinion issued in corresponding PCT Application No. PCT/US2021/055715 mailed on Mar. 22, 2022.

\* cited by examiner

CONSTRUCTION APPARATUSES AND METHODS OF USE THEREOF

CROSS-REFERENCE TO RELATED APPLICATION

The present application claims the priority benefit of U.S. Provisional Ser. No. 63/094,115, entitled "PORTABLE MOLDING APPARATUS AND METHODS OF USE THEREOF" and filed on Oct. 20, 2020, which is incorporated herein in its entirety.

TECHNICAL FIELD

The present disclosure relates generally to apparatuses and methods related to formation of construction blocks for building structures, and more particularly, to a molding apparatus for producing foam construction blocks.

BACKGROUND

In underdeveloped countries and other remote parts of the world, large segments of the population reside in simple structures that may not provide adequate protection from the elements and may be particularly susceptible to extreme weather, storms, floods, earthquakes, and other natural disasters. Some houses are constructed of durable concrete, but concrete structures are typically expensive to build and require skilled labor to construct. While technology related to building and construction has seen significant advancements, the technology is often difficult to apply in the context of affordable housing.

As such, it would be advantageous to have a construction apparatus for producing modular construction blocks that is easily portable to remote constructions sites (e.g., in underdeveloped countries). It would be further advantageous to have a construction apparatus that efficiently produces modular construction components and that is operable with limited manpower.

SUMMARY

In an embodiment, a construction apparatus is provided. The construction apparatus comprises a first shell piece and a second shell piece which may be configured to move with respect to one another between an open configuration and a closed configuration. The first shell piece and the second shell piece may further define an interior chamber which may define a space to receive a moldable material. A sealing mechanism may be used to form a seal between the first shell piece and the second shell piece in the closed configuration, and a separation mechanism having at least one jack may separate the first shell piece and the second shell piece in the open configuration. The moldable material may be cured into a molded block in the interior chamber when the first shell piece and second shell piece are in the closed configuration, and the molded block may be removed from the interior chamber when the first shell piece and second shell piece are in the open configuration.

In other embodiments, a method of using a construction apparatus is described. The method may involve positioning a first shell piece and a second shell piece in a closed configuration, such that the first shell piece and the second shell piece define an interior chamber. A fluid-tight seal may then be created between the first shell piece and the second shell piece using a sealing mechanism. Once the seal is established, the method may include injecting moldable material into the interior chamber defined by the first shell piece and the second shell piece, and curing the moldable material within the interior chamber to form a molded block. With the molded block formed, the first shell piece and second shell piece may be shifted to an open configuration using a separation mechanism having at least one jack. In the open configuration, the method may finally involve extracting the molded block from the first shell piece and the second shell piece.

These and additional features provided by the embodiments described herein will be more fully understood in view of the following detailed description, in conjunction with the drawings.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

DETAILED DESCRIPTION

Figure 1:
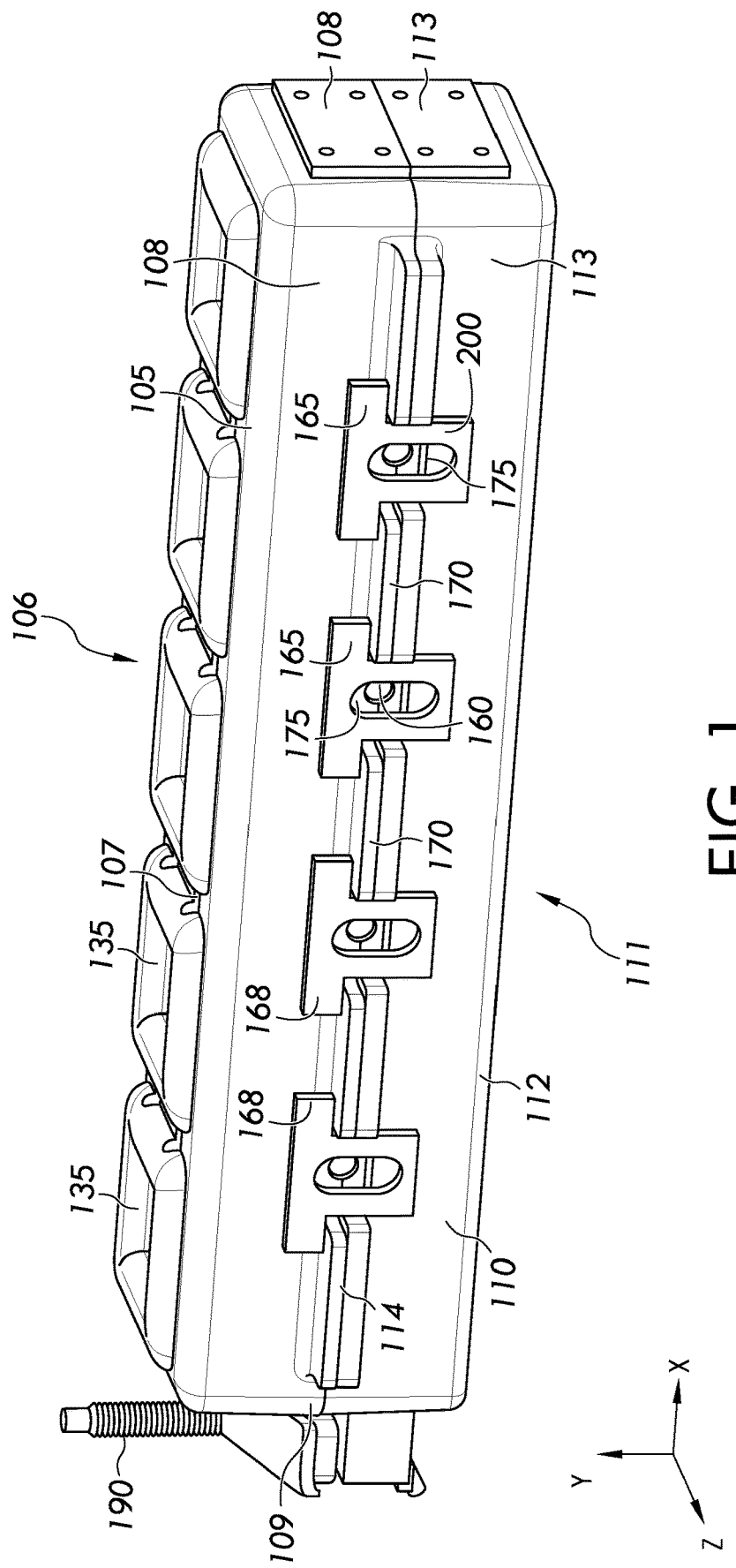
FIG. 1 depicts a side perspective view of an illustrative construction apparatus for forming modular construction components in a closed configuration in accordance with one or more embodiments shown and described herein.

The present disclosure generally relates to a construction apparatus that is used for forming modular construction blocks. The construction apparatus described herein includes first and second shell piece portions, a separation device, one or more pins and/or one or more retaining plates, and is easily portable to remote construction sites or the like. As further described herein, the construction apparatus should be configured to produce modular construction blocks with limited manpower. In some embodiments, the construction apparatus can produce construction blocks at a sufficient rate such that block production does not hinder the construction process.

Conventional low-cost housing solutions often involve constructing structures out of modular components, such as blocks formed from foam (e.g., polystyrene or polyurethane) or concrete. Often referred to as insulated construction forms (ICF), modular components may provide relatively cost-effective means for constructing comfortable, resilient, and affordable housing. ICF blocks may be formed from a liquid compound, a foam compound, or the like using a mold. The compound may be deposited into a cavity of the mold and allowed to cure such that the compound takes the shape of the cavity. In some cases, a foam may be formed by combining two separate liquid components within the mold, thereby inducing curing. In some cases, a different catalyst may be used to induce curing.

Modular components may be manufactured and transported to a construction site for assembly into a housing structure. However, this approach may be impeded by various challenges. For example, large distances and/or geographical barriers between a manufacturing site and a construction site may increase the time, cost, and resources required for constructing the structure. In many underdeveloped countries, roads and infrastructure may also be inadequate for safe and reliable transport of modular components.

Additional conventional low-cost housing solutions involve transporting machinery and construction apparatuses to building sites and fabricating the modular components on-site. However, existing apparatuses for on-site construction may have various drawbacks. For example, the apparatuses may be bulky and/or unfit for easy transport. The apparatuses may also require significant manpower, often utilizing three or more individuals to safely operate the apparatuses. In some cases, several individuals may be required to safely remove the formed modular components from the apparatus. Further, the apparatuses may produce construction blocks at a relatively slow rate that serves as a limiting factor for the time necessary to complete construction. For example, removal of the molded modular components without causing damage thereto may be a tedious and time consuming process.

The construction apparatus described herein provides a compact and portable solution for forming modular construction blocks, which is capable of being used in even the most remote locations. The construction apparatus may also be easily operated by a single manual user, thereby alleviating the need for significant man power when forming the modular construction blocks. By creating an apparatus which is both portable and operable, the construction apparatus is able to minimize the cost, time, and resource issues which are presented by many conventional construction molding apparatuses.

Figure 2:
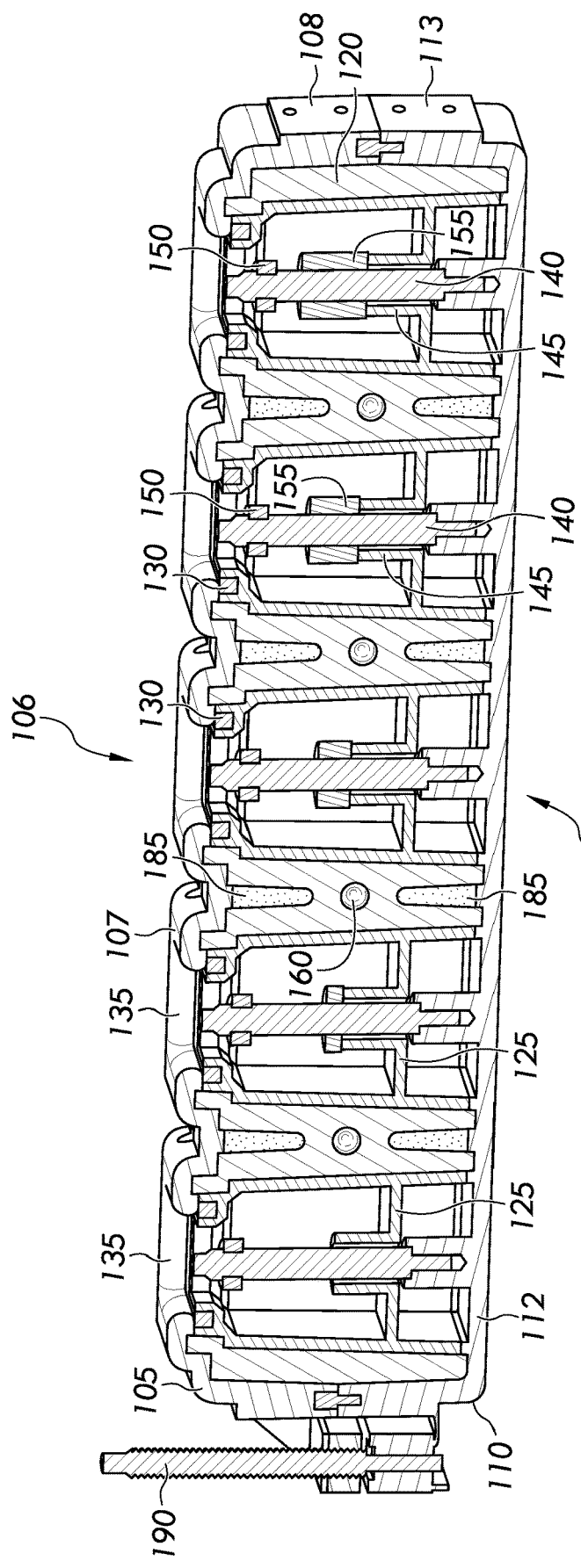
FIG. 2 depicts a cross-sectional view of an illustrative construction apparatus in a closed configuration in accordance with one or more embodiments shown and described herein.
Figure 3:
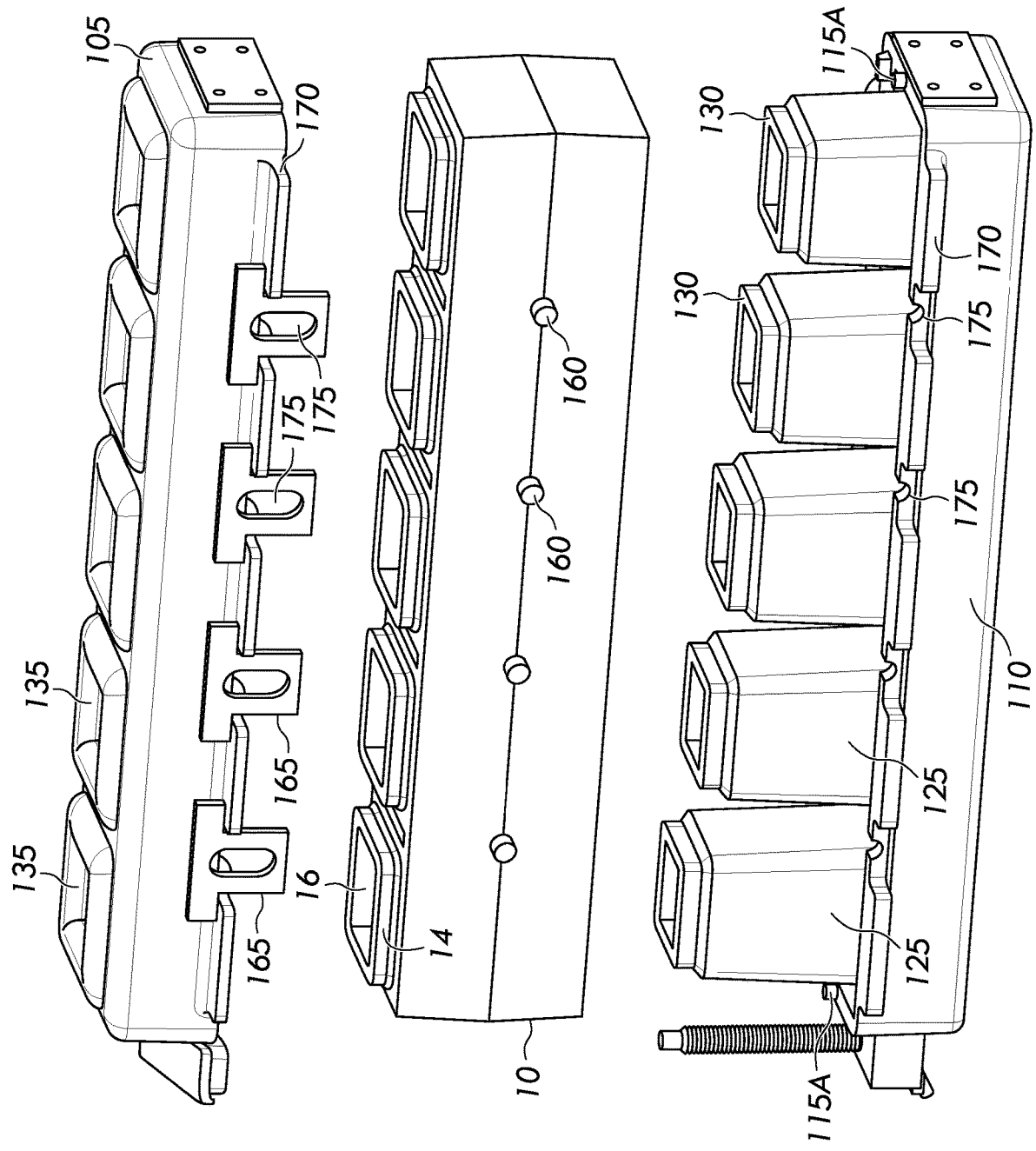
FIG. 3 depicts a perspective view of an illustrative construction apparatus in an open configuration in accordance with one or more embodiments shown and described herein.
Figure 4:
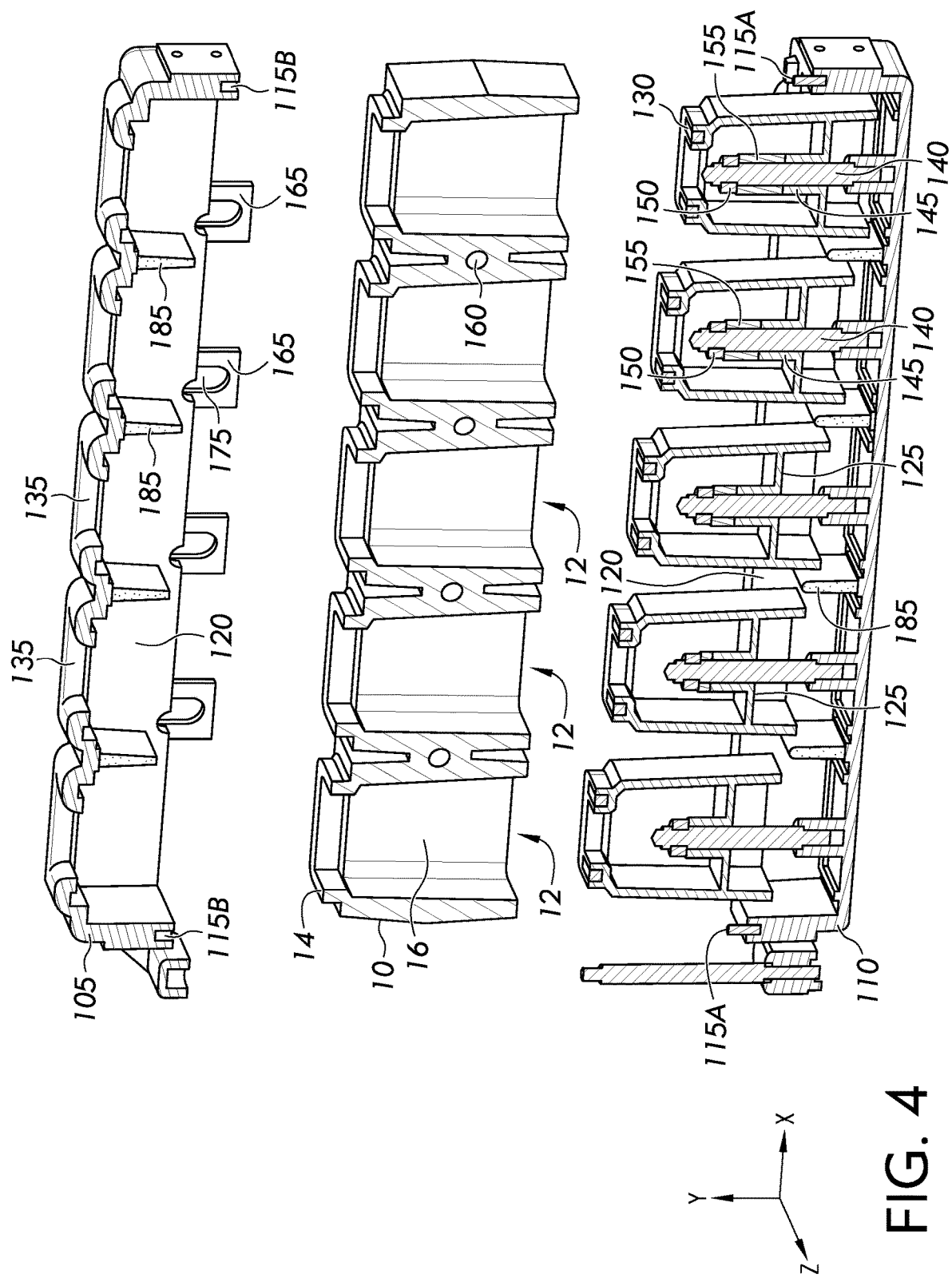
FIG. 4 depicts a cross-sectional view of an illustrative construction apparatus in an open configuration in accordance with an embodiment.

FIG. 1 depicts a perspective view of an illustrative construction apparatus for forming modular construction components in a closed configuration in accordance with an embodiment. FIG. 2 depicts a cross-sectional view of a construction apparatus in a closed configuration in accordance with an embodiment. FIG. 3 depicts a perspective view of a construction apparatus in an open configuration in accordance with an embodiment. FIG. 4 depicts a cross-sectional view of a construction apparatus in an open configuration in accordance with an embodiment. Where possible, similar features within FIGS. 1-4 are identified with common reference numbers.

As shown in FIGS. 1-4, the construction apparatus 100 includes a first shell piece 105, a second shell piece 110, a separation device 190 (not depicted), one or more cores 125, one or more pins 160, and/or one or more retaining plates 165. While FIGS. 1-4 depict the first shell piece 105 as being an upper shell piece and the second shell piece 110 as being a lower shell piece, the present disclosure is not limited to such. That is, the first shell piece 105 and the second shell piece 110 could be side pieces in other embodiments.

As shown in FIGS. 1-2, the first shell piece 105 may include a body 106 having a top 107 and a plurality of upper side walls 108 about the top and extending downward therefrom. Similarly, the second shell piece 110 may include a body 111 having a base 112 and a plurality of lower side walls 113 about the base 112 and extending upward therefrom. In the closed configuration, the first shell piece 105 and second shell piece 110 may be joined together such that the upper side walls 108 and the lower side walls 113 contact each other to form an interior chamber 120 configured to hold and shape a moldable material (e.g., as shown in FIG. 2) for the formation of molded blocks and/or other molded components. Furthermore, the interior chamber 120 may be filled with the moldable material, such as by a nozzle or the like, when the first shell piece 105 and second shell piece 110 are in the closed configuration, as described in greater detail herein. As most clearly shown in FIG. 3, the first shell piece 105 and second shell piece 110 may be separated from one another (e.g., in the open configuration) to remove the molded block 10 from the interior chamber 120. In some embodiments, the first shell piece 105 and/or the second shell piece 110 may include apertures 135 for alignment with cores 125 as further described herein.

In some embodiments, the first shell piece 105 and the second shell piece 110 may each be created as a single piece construction. In other embodiments, the first shell piece 105 and the second shell piece 110 may be formed together as a single piece construction. In other embodiments still, the first shell piece 105 and second shell piece 110 may comprise separate walls which are coupled together to form the construction apparatus 100. In this embodiment, the separate walls of the first shell piece 105 and second shell piece 110 may be used interchangeably and/or exchanged with one another, such that the construction apparatus 100 is capable of conforming to a desired shape and/or size, which in turn forms molded blocks 10 that are of the desired shape and/or size and effectively increases the modularity of the construction apparatus 100.

The various components of the construction apparatus 100 as described herein may be constructed of any type of material or combination of materials suitable for molding. For example, the first shell piece 105, the second shell piece 110, the cores 125, and additional components may be formed from aluminum castings. Additional materials such as metal, metal alloys, composites, and the like are contemplated herein. In some embodiments, the components of the construction apparatus may be formed by stamping, casting, forging, and/or additional processes as would be apparent to a person having an ordinary level of skill in the art.

The interior chamber 120 may be a cavity or space defined by the top, the base, and the upper side walls 108, and the lower side walls 113. The interior chamber 120 may contain and shape a moldable material into a molded block 10. That is, the top 107, the base 112, the upper side walls 108, and the lower side walls 113 that form the interior chamber 120 may be shaped, sized, patterned, and/or have features thereon that, when containing the moldable material, impart corresponding shapes, sizes, patterns, and/or features on the moldable material when cured. While the interior chamber 120 is depicted as substantially rectangular or box-shaped, it should be understood that the interior chamber 120 may be formed in a variety of shapes and sizes corresponding to a shape and/or size of an object to be formed from the moldable material. Accordingly, the top 107, the base 112, and the upper and lower side walls 108, 113 may be configured and oriented to form the interior chamber 120 as required. Further, the surfaces of the first shell piece 105 and the second shell piece 110 may include curved or patterned shapes to form the interior chamber 120 in a manner corresponding to a desired shape of the molded block 10 to be formed from the moldable material. In some embodiments, the first shell piece 105 and second shell piece 110 may include rounded edges to form a molded block 10 with rounded edges. In some embodiments, the first shell piece 105 and second shell piece 110 may include angled walls to form a molded block 10 with angled walls. In some embodiments, the shape and/or size of the interior chamber 120 (and thus the molded block 10 formed therefrom) may be fixed based on the shapes and sizes of the top 107, the base 112, the upper side walls 108, and the lower side walls 113. In other embodiments, the shape and/or size of the interior chamber 120 (and thus the molded block 10 formed therefrom) may be adjustable by adjusting the relative arrangement of the top 107, the base 112, the upper side walls 108, and/or the lower side walls 113, and/or by swapping one or more of the top 107, the base 112, the upper side walls 108, or the lower side walls 113 with other, differently sized components. In some embodiments, the interior surfaces of the top 107, the base 112, the upper side walls 108, and the lower side walls 113 may be configured such that patterns and/or surface features located on interior surfaces thereof can be adjusted to impart certain patterns and/or surface features on the resulting molded block 10 in predetermined locations. For example, interior surfaces of the top 107, the base 112, the upper side walls 108, and/or the lower side walls 113 may have slots, ports, and/or the like for receiving removable surface features and/or the surface features located on the interior surfaces may be adjustable.

In some embodiments, the first shell piece 105 and/or second shell piece 110 may further include one or more fins 185 coupled to the top and/or the base and extending therefrom into the interior chamber 120. The fins 185 may be configured to form features on the molded blocks 10. For example, as shown in FIG. 2, the moldable material may settle around the fins 185 in the interior chamber 120. Accordingly, upon curing, the molded blocks 10 may include grooves in locations corresponding to the fins 185 as shown in FIG. 4. While the fins 185 are demonstrated as being positioned between the cores 125, it should be understood that the fins 185 may positioned at any desired location within the interior chamber 120 to form grooves or other cavities in the molded blocks 10 at corresponding locations as would be apparent to a person having an ordinary level of skill in the art. In some embodiments, a fin 185 may be removable from a shell 105/110. In some embodiments, a fin 185 may be permanently affixed and/or formed integrally with a shell 105/110

The first shell piece 105 and second shell piece 110 may be configured to shift between a closed configuration (e.g., as shown in FIGS. 1-2) and an open configuration (e.g., as shown in FIGS. 3-4). As shown in FIG. 1, the first shell piece 105 and the second shell piece 110 may be mated to form the closed configuration for containing moldable material to form a molded block 10. In some embodiments, a lower surface 109 of the first shell piece 105 may be mated with an upper surface 114 of the second shell piece 110 to form the closed configuration. The lower surface 109 of the first shell piece 105 may correspond to a bottom edge of the upper walls 108, while the upper surface 114 of the second shell piece 110 may correspond to an upper edge of the lower walls 113. In some embodiments, the first shell piece 105 and/or the second shell piece 110 include mating features to facilitate proper alignment and coupling of the first shell piece 105 and the second shell piece 110. For example, as most clearly shown in FIGS. 3-4, the second shell piece 110 may include one or more protrusions 115A extending from the upper surface of the second shell piece 110, and the first shell piece 105 may include one or more holes 115B that are each configured to receive a protrusion 115A therein to couple the first shell piece 105 to the second shell piece 110. It should be appreciated that the protrusions 115A and the holes 115B are merely illustrative examples of mating features that may be utilized, and other mating features not described herein are included within the scope of the present disclosure.

In some embodiments, the first shell piece 105 and/or second shell piece 110 may include one or more latches or other fasteners to couple the first shell piece 105 to the second shell piece 110 and hold the shell pieces together. In some embodiments, the first shell piece 105 may be hingedly coupled to the second shell piece 110 by one or more hinges. As such, the first shell piece 105 and the second shell piece 110 may be moved between the closed configuration and the open configuration by rotating the hinges. In some embodiments, a peripheral lip of the first shell piece 105 may be configured to mate with a peripheral lip of the second shell piece 110, e.g., by being formed with complementary surfaces such as tongue and groove features. However, various types of mating surfaces and features are contemplated herein as would be apparent to a person having an ordinary level of skill in the art.

In some embodiments, additional features may be used to form a seal between the first shell piece 105 and the second shell piece 110 and to maintain the construction apparatus 100 in the closed configuration throughout the molding process. In some instances, a tight seal may be necessary to ensure that the moldable material is adequately formed by the interior chamber 120 and that the moldable material does not overflow out of the interior chamber 120. In some embodiments, one or more clamps may be used to clamp the first shell piece 105 to the second shell piece 110 to ensure a tight seal therebetween. For example, a c-clamp, a hand screw clamp, a vice, and/or additional types of clamps may be used to clamp the first shell piece 105 to the second shell piece 110. In some embodiments, one or more fasteners may be used to form a tight seal between the first shell piece 105 and the second shell piece 110. Additional means of forming a tight seal between the first shell piece 105 and the second shell piece 110 are contemplated herein as would be apparent to a person having an ordinary level of skill in the art.

In some embodiments, the construction apparatus 100 may include a separation device 190 for separating the first shell piece 105 from the second shell piece 110, thereby shifting the construction apparatus 100 from the closed configuration to the open configuration. In some instances, shifting the construction apparatus 100 to the open configuration must be performed delicately in order to separate the molded block 10 from the first shell piece 105 and/or the second shell piece 110 without damaging the molded block 10. For example, it may be preferable to lift the first shell piece 105 directly upward from both sides.

In some embodiments, the separation device 190 includes one or more jacks, e.g., a lift jack, a scissor jack, and/or additional types of jacks. In some embodiments, the construction apparatus 100 includes a jack coupled to each of the first shell piece 105 and the second shell piece 110 and configured to separate the first shell piece 105 from the second shell piece 110 when operated. In some embodiments, the jacks are manually operated by a hand tool and/or by a power tool (e.g., a drill) to separate the shells 105/110. In some embodiments, the jacks are motorized such that separation may occur quickly and may be performed by a single person. Other types of manual devices and/or motorized devices for separating the first shell piece 105 from the second shell piece 110 are contemplated herein. In some embodiments, the construction apparatus 100 includes a plurality of separation devices 190, e.g., a jack situated on each of a first end and a second end, opposite the first end, of the shells 105/110 to allow for evenly separating the shells 105/110 from each end in a substantially simultaneous manner.

As most clearly shown in FIG. 3, the construction apparatus may further include one or more cores 125 positioned within the interior chamber 120 to allow for additional shaping of the moldable material. In some embodiments, the cores 125 are positioned to form a void in the resulting molded block 10. In some embodiments, it may be desirable to include a void in the molded block 10 that is shaped and/or sized to receive a portion of another molded block 10 or another component. For example, a void in a first one of the molded blocks 10 may be aligned, shaped, and/or sized to receive a corresponding protrusion or the like in a second one of the molded blocks 10 such that the blocks can be joined together to construct a structure. Accordingly, the molded blocks 10 may be formed with voids shaped to allow the blocks to be partially nested within one another. In some embodiments, each of the cores 125 may be hollow to minimize the weight of the cores 125 and the construction apparatus 100 as a whole, thereby easing transport and handling during use. Additionally, forming hollow cores 125 may reduce the cost associated with manufacture of the construction apparatus 100 and may provide additional surface area for heat transfer out of the construction apparatus 100 during cooling and curing of the moldable material within the interior chamber 120 as further described herein. Furthermore, the cores 125 may include additional features such as fins, channels, pins, or the like, which increase the surface area within the hollow cores 125. By adding these features to the hollow cores 125, a coolant (e.g., air from an external environment, liquid coolant, etc.) may be forced through a greater surface area of the hollow cores 125, which may in turn result in the coolant extracting additional heat from the moldable material, thereby decreasing the time required for cooling and curing of the molded block 10. While the benefits of hollow cores 125 have been described herein, it should further be noted that cores 125 that are substantially filled or solid in their construction are also contemplated as would be apparent to a person having an ordinary level of skill in the art.

When assembled, the cores 125 may form a seal with each of the first shell piece 105 and the second shell piece 110. For example, as shown in FIG. 2, the top 107 of the first shell piece 105 may be contacted by each core 125 along the entire periphery of the core 125, thereby sealing the interior chamber 120 from the hollow interior of the core 125. Similarly, the base 112 of the second shell piece 110 may be contacted by each core 125 along the entire periphery of the core 125, thereby sealing the interior chamber 120 from the hollow interior of the core 125. In some embodiments, a sealing component 130 (e.g., a gasket, a sealing ring, or other compressible sealing component) may be positioned at the interface of each core 125 with the first shell piece 105 and/or the second shell piece 110 to form a fluid-tight seal to prevent leaking of the moldable material.

In some embodiments, the sealing component 130 may be integrated into the first and/or second shell piece 105, 110. For example, the sealing component 130 may be formed into an interior portion of the upper side walls 108 or the top 107 of the first shell piece 105 such that the sealing component 130 may be secured to the cores 125. Similarly, the sealing component 130 may be formed into an interior surface of the lower side walls 113 or base 112. In other embodiments, the sealing component 130 may be a separate component, which is affixed to the first and/or second shell piece 105, 110 prior to the first and second shell piece 105, 110 moving to the closed configuration and receiving the moldable material. In other embodiments still, the first shell piece 105 and second shell piece 110 may be formed of material that effectively creates a seal with the cores 125 when the two components are brought together. Similarly, the interior surface of the top 107 of the first shell piece 105 and the base 112 of the second shell piece 110 may be coated with material that creates a seal when brought together with the cores 125. In these embodiments, a seal would be created between the first shell piece 105 and/or the second shell piece 110 and the cores 125 when the separation device 190 moves the first shell piece 105 and the second shell piece 110 to the closed configuration.

Where the cores 125 are sealed to the first shell piece 105 and/or the second shell piece 110, the construction apparatus 100 may be configured for heat transfer through the hollow interior of the cores 125 as described herein. In some embodiments, the first shell piece 105 and/or the second shell piece 110 include apertures 135 that are aligned with the cores 125 as most clearly shown in FIG. 2. Accordingly, when the interior chamber 120 is filled with moldable material in the closed configuration, the hollow interiors of the cores 125 may be open to the external environment through the apertures 135, thereby facilitating heat transfer there through. In these embodiments, heat is transferred from the interior chamber 120 across the surface area of the hollow interior of each core 125 and into the ambient air. Thus, cooling and curing of the moldable material is accelerated in order to reduce the time required for production of a molded block 10. In some embodiments, the apertures 135 may conform in shape to the portion of the hollow interior of the cores 125 which is open to the external environment. Due to the sealing construction of the cores 125 with the first shell piece 105 and the second shell piece 110, conforming the shape of the apertures 135 to the cores 125 ensures that the seal created between the cores 125 and the first shell piece 105 and the second shell piece 110 further acts to seal the apertures 135 with respect to the interior chamber 120, thereby preventing leaking of moldable material through the apertures 135.

In some embodiments, the apertures 135 may further comprise a receptacle adapted for receiving a nozzle of a filling hose. In these embodiments, the nozzle of a filling hose may be passed through the apertures 135 and into the hollow interior of the cores 125, such that the nozzles may fill the hollow interior cores with coolant, such as water, which may further expedite the cooling and curing of the moldable material.

In some embodiments, the cores 125 may be movable upward and downward to facilitate removal of a cured molded block 10 from the interior chamber 120. During the molding process, the moldable material may partially adhere to the cores 125 and thus the molded block 10 may need to be forced apart from each core 125. Separating the molded block 10 from a plurality of cores 125 simultaneously may require greater force and may result in damage to the molded block 10. Accordingly, as most clearly shown in FIG. 4, each of the cores 125 may be coupled to rods 140 extending from the base of the second shell piece 110. For example, the cores 125 may each include a sleeve portion 145 that extends into the hollow interior of the core 125 and surrounds the rod 140 to slide therealong. Further, the rods 140 may include a stop 150 proximate an upper end of the rod 140. The stop 150 may include a widened region of the rod 140 sized and configured to prevent sliding of the sleeve portion 145 beyond the stop 150. Accordingly, the cores 125 may be lifted from the base of the second shell piece 110 until the sleeve portion 145 reaches the stop 150. As shown in FIG. 4, a spacer 155 may be placed on one or more rods 140 between the stop 150 and the sleeve portion 145. The spacers 155 may vary in length to limit the slidable distance of each core 125. Accordingly, each core 125 may be movable by a distance dictated by the presence of a spacer 155 and the length of the spacer 155. In operation, each core 125 may contact the base of the second shell piece 110 in the closed configuration during molding as shown in FIG. 2. When the construction apparatus 100 is shifted to the open configuration and/or when the molded block 10 is lifted from the second shell piece 110, the cores 125 may be lifted therewith by sliding of the sleeve portions 145 along the rods 140. For example, once the moldable material has formed the molded block 10, the block 10 may be at least partially adhered to the cores 125, such that when the block 10 is moved in a vertical direction (e.g., upwardly away from the base 112), the cores 125 slide along the sleeve portions 145 of the rods 140 in correspondence with the block 10. Each core 125 may reach a travel limit set by the stop 150 and spacer 155 at different heights and thus the cores 125 may be successively forced apart from the molded block 10 rather than being forced apart simultaneously. In the example of FIG. 4, spacers 155 are progressively shorter from right to left such that the rightmost core 125 travels the least distance along the rod 140 before reaching the travel limit and releases from the molded block 10 earliest in time. Thereafter, each core 125 may successively reach the travel limit and separate from the molded block 10 until the leftmost core 125 is finally separated from the molded block 10. Successive release of the cores 125 thereby reduces the force required to release the molded block 10 and decreases the likelihood of damaging the molded block 10. In these embodiments, the sleeve portions 145 may be freely movable in a vertical direction between the base 112 of the second shell piece 110 and the spacers 155 and the stops 150 along the rods 140. Once the molded block 10 is released from the cores 125, the sleeve portions 145 may fall (e.g., by way of a force, such as due to gravity) to the base 112 of the second shell piece 110, which effectively returns the cores 125 to their original position. Once the cores 125 have been reset, the first and second shell piece 105, 110 may be moved to the closed configuration, and the interior chamber 120 may be filled with new moldable material. In some embodiments, a spacer may not be present in one or more of the cores 125. For example, as shown in FIG. 4, the leftmost core 125 is not limited by a spacer 155 such that the sleeve portion 145 directly contacts the stop 150.

In some embodiments, each core 125 may be immovable with respect to the outer shell 110. For example, a core 125 may be limited by a spacer 155 sized to constrict any upward movement of the core 125. In such an embodiment, the core 125 is substantially stationary and may be the first core 125 to release from the molded block 10. In another example, a core 125 may be permanently affixed to the outer shell 110 (e.g., formed as a unitary body therewith). Accordingly, the core 125 is substantially stationary and may be the first core 125 to release from the molded block 10. In such a case, a corresponding rod 140, sleeve portion 145, stop 150, and/or spacer 155 may be omitted as would be apparent to a person having an ordinary level of skill in the art. In these embodiments, the cores 125 may be coated with a material which prevents and/or minimizes adhesion between the cores 125 and the molded block 10, in order to ease the removal of the molded block 10 from the cores.

In additional embodiments, fewer components may be required to allow for movement of the cores 125 and successive release of the molded block 10. In some embodiments, the spacer 155 may be omitted, and the sleeve portions 145 of each core 125 may be varied in length to allow for successive release of the cores 125 in substantially the same manner as would be apparent to a person having an ordinary level of skill in the art. In some embodiments, the spacer 155 may be omitted and the stop 150 of each rod 140 may be varied in length to allow for successive release of the cores 125 in substantially the same manner as would be apparent to a person having an ordinary level of skill in the art. In some embodiments, the spacer 155 may be omitted and the location of the sleeve portions 145 on each core 125 may be varied to allow for successively release of the cores 125 in substantially the same manner. For example, where the sleeve portion 145 is lower on the core 125, greater upward movement may be permitted before reaching the stop 150.

While the cores 125 are generally described herein as successively releasing the molded block 10, in some embodiments, a plurality of cores 125 may be released from the molded block 10 simultaneously. For example, the cores 125 may release by reaching their travel limit along the rods 140 simultaneously (e.g., having spacers 155 of equal length). Accordingly, more than one core 125 may be released from the molded block 10, such as two at a time, three at a time, or the like. Further, while the cores 125 are generally described as independently movable, in some embodiments, one or more cores 125 may be movable together. For example, the cores 125 may be joined at a portion to move upward and downward in unison.

In some embodiments, the rods 140 may be temporarily affixed to the second shell piece 110 (e.g., by mating features, interference fit, etc.) and may be removable from the second shell piece 110. In some embodiments, the rods 140 may be permanently affixed to the second shell piece 110 and/or formed as a unitary body therewith.

While the successive release of the cores 125 is advantageous as described herein, in some embodiments, the cores 125 may be stationary. For example, the cores 125 may be temporarily fixed to the second shell piece 110 by mating features, friction fit, fasteners, and the like. Furthermore, the cores 125 may be temporarily fixed to the second shell piece 110 by way of a releasable locking mechanism, which may be removed if there is need for the cores 125 to move. In another example, the cores 125 may be formed as a unitary body with the second shell piece 110. In such a case, the rods 140, sleeve portions 145, stops 150, and/or spacers 155 may be omitted as would be apparent to a person having an ordinary level of skill in the art.

Referring once again to FIGS. 1-3, the construction apparatus 100 may further include an extraction mechanism 200 for removing the molded block 10 from the second shell piece 110 and/or the cores 125. The extraction mechanism 200 may include one or more pins 160 and one or more retaining plates 165 spaced along the first shell piece 105. As shown in FIG. 1, the retaining plates 165 may be T-shaped plates that are supported by flanges 170 extending from the first shell piece 105. The flanges 170 may extend from a lower portion of the upper walls 108 of the first shell piece 105 (e.g., in the z-direction, as shown in FIG. 1) such that the flanges 170 lie flush with the lower surface 109 of the upper walls 108. The flanges 170 may be spaced apart (e.g., in the x-direction, as shown in FIG. 1) across the length of the upper walls 108 of the first shell piece 105 such that an arm 168 of the retaining plates 165 may extend between the flanges 170. In some embodiments, fasteners and the like may be used to secure the retaining plates to the first shell piece 105. In some embodiments, the retaining plates 165 may be formed as a unitary body with the first shell piece 105. In some embodiments, the retaining plates 165 may be affixed to the first shell piece 105 and/or second shell piece 110 after the first and second shell pieces 105, 110 have been moved to the closed configuration to assist in securing the first and second shell piece 105, 110. In embodiments in which the retaining plates 165 are formed as part of the first shell piece 105 and/or second shell piece 110, the retaining plates 165 may be formed of a flexible material which is capable of bending to receive the pins 160 and secure the first shell piece 105 and the second shell piece 110.

In some embodiments, retaining plates 165 may be included on a front side and a back side of the first shell piece 105. For example, a first row of retaining plates 165 may be provided on a front side of the first shell piece 105 (as shown in FIG. 3) and a second row of retaining plates 165 may be provided on a back side of the first shell piece 105 (as shown in FIG. 4). The retaining plates 165 may define slots 175 therein to receive the pins 160. Accordingly, pins 160 may be inserted through the slots 175 of the first row of retaining plates 165. The pins 160 may extend through openings in the first shell piece 105 and/or the second shell piece 110. For example, the first shell piece 105 and second shell piece 110 may include slots 175 (e.g., as shown in FIG. 3) that, in the closed configuration, form an opening for receiving the pins 160 (e.g., as shown in FIG. 1). In some embodiments, the openings may be entirely formed in the first shell piece 105 or the second shell piece 110. Accordingly, the pins 160 may extend through the interior chamber 120 and through the slots 175 of the second row of retaining plates 165.

In operation, the pins 160 may be inserted into the retaining plates 165 by way of slots 175 once the first shell piece 105 and second shell piece 110 are moved to the closed configuration. After the pins 160 have been inserted, moldable material may be inserted into the interior chamber 120 and may settle around the pins 160 in the interior chamber 120 such that the moldable material cures and forms the molded block 10 with the pins 160 extending therethrough as shown in FIGS. 2-3. When the construction apparatus 100 is shifted to the open configuration by the separation device 190, the pins 160 may be lifted with the first shell piece 105 due to constraint of the pins 160 within the slots 175 of the retaining plates 165. Accordingly, the pins 160 may lift the molded block 10 out of the second shell piece 110 by the action of the separation device 190, thereby facilitating fast and simple removal of the molded block 10 from the second shell piece 110. Thereafter, the pins 160 may be easily removed from the molded block 10 by sliding the pins laterally (e.g., in the +/−z direction as shown in FIG. 3). In some embodiments, the pins 160 may be easily removed by a user applying a manual force to slide the pins in the lateral direction, however, additional mechanical components may be used to remove the pins if necessary. The resulting molded block 10 will thus include substantially horizontally extending channels therein as a result of the removal of the pins 160.

In some embodiments, it may be desirable to additionally or alternatively use the extraction mechanism 200 to separate the molded block 10 from the first shell piece 105. For example, after separating the molded block 10 from the second shell piece 110 as described herein, a user may further require assistance to separate the molded block 10 from the first shell piece 105. Accordingly, the construction apparatus 100 may be returned to the closed configuration and the retaining plates 165 may be removed, flipped, and secured to the second shell piece 110 in substantially the same manner as would be apparent to a person having an ordinary level of skill in the art. Thereafter, the separation device 190 may be used once more to shift the construction apparatus 100 to the open configuration, and the constrained pins 160 may force the molded block 10 away from the first shell piece 105 in substantially the same manner, thereby removing the molded block 10 from both the first shell piece 105 and the second shell piece 110. In some embodiments, the molded block 10 may be easily removed from the first shell piece 105 by hand without requiring the use of the extraction mechanism 200. In some embodiments, the extraction mechanism 200 may be used solely to remove the molded block 10 from the first shell piece 105, and the molded block 10 may be removed from the second shell piece 110 by hand without requiring the use of the extraction mechanism 200.

In some embodiments, the construction apparatus 100 may be freestanding and may be placed on a surface (e.g., a table, a bench, a cart, substantially level ground, and the like) for operation. Advantageously, the freestanding design of the construction apparatus 100 minimizes the overall weight to facilitate easy transport to and from construction sites. However, in some embodiments, the construction apparatus may be permanently or removably coupled to a base. For example, one or more supports or arms may be coupled to the first shell piece 105 and/or the second shell piece 110 and may extend downward to support the first shell piece 105 and second shell piece 110 above a surface, e.g., above ground level. In some embodiments, the base may include one or more wheels and/or one or more handles to assist in transport of the construction apparatus 100. For example, wheels may be used to push or pull the construction apparatus 100 without the need for large machinery, such as a crane, hydraulic or pneumatic lift systems, motorized vehicles, and the like.

As shown and described, the construction apparatus 100 may include five cores 125 to produce a molded block 10 including five voids. However, the construction apparatus 100 may include any number of cores 125 to produce a corresponding number of voids. For example, the construction apparatus may include one, two, three, four, five, six, seven, eight, or greater than eight cores 125.

While various components may be described and/or depicted as part of the second shell piece 110, it should be understood that the components may be additionally or alternatively provided on the first shell piece 105 with minor modifications. For example, the cores 125, rods 140, and accompanying components may be reversed and attached to the first shell piece 105. In another example, the protrusions 115A may be provided on the first shell piece 105 and the holes 115B may be provided on the second shell piece 110. Similarly, it should be understood that the various components described and/or depicted as part of the first shell piece 105 may be additionally or alternatively provided on the second shell piece 110 with minor modifications. For example, a sealing component 130 may be provided between the cores 125 and the second shell piece 110 to create a tight seal therebetween. In another example, the retaining plates 165 may be coupled to the second shell piece 110. Various additional modifications may be made to the construction apparatus 100 as would be apparent to a person having an ordinary level of skill in the art.

Figure 5:
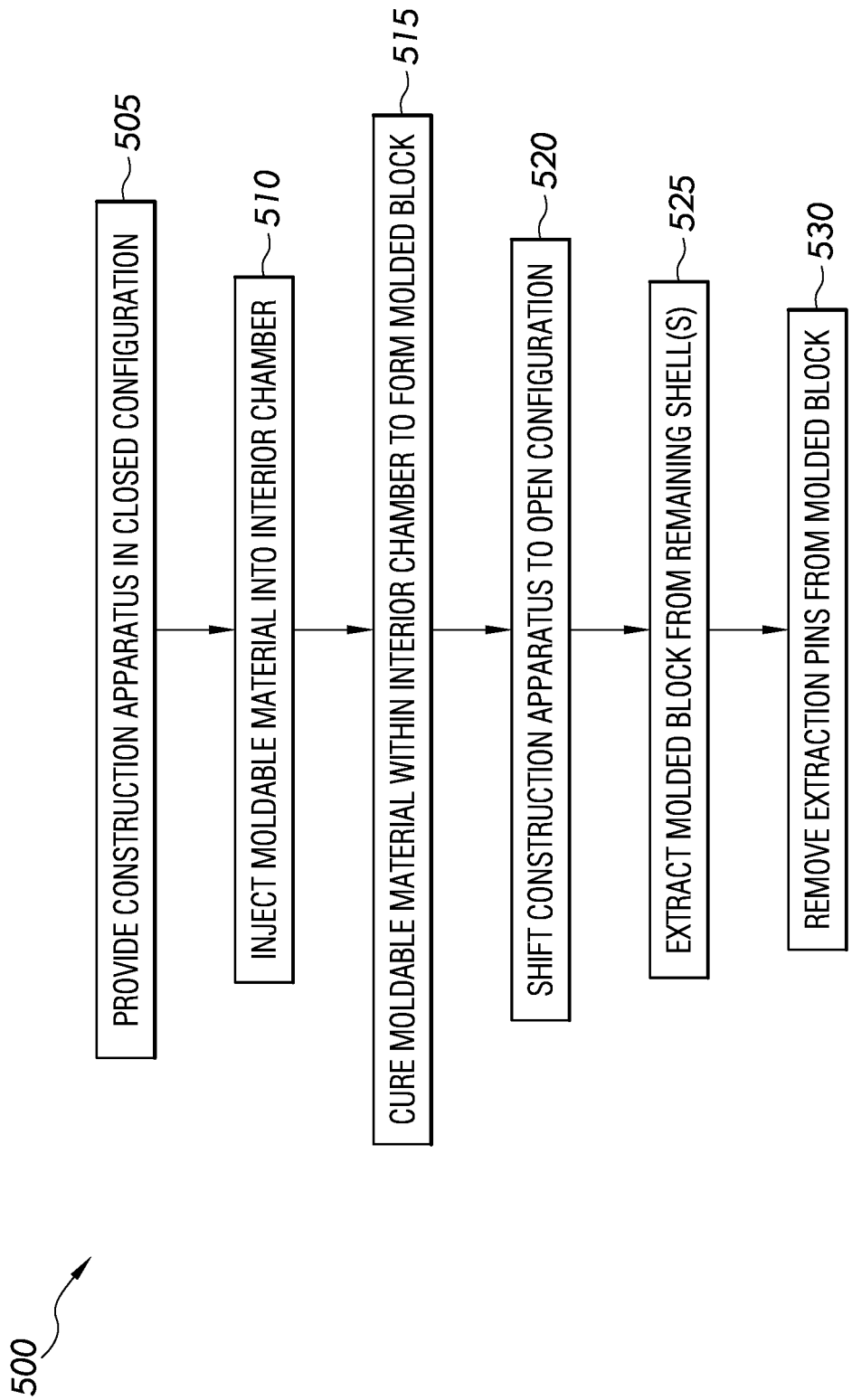
FIG. 5 depicts a flow diagram of an illustrative method for forming a molded block with a construction apparatus in accordance with one or more embodiments shown and described herein.

FIG. 5 illustrates a method of using a construction apparatus (e.g., construction apparatus 100). As shown in FIG. 5, a flow diagram of an illustrative method for forming a molded block with a construction apparatus is depicted in accordance with an embodiment. The method 500 includes providing 505 the construction apparatus in the closed configuration and injecting 510 moldable material into an interior chamber of the construction apparatus. For example, the moldable material may be injected through a port on the construction apparatus that communicates with the interior chamber.

The method 500 further includes curing 515 the moldable material within the interior chamber to form a molded block. For example, the moldable material may be allowed to cool at room temperature for a predetermined amount of time and/or may be actively chilled until the moldable material is cured. In some embodiments, the moldable material is a foam material. For example, the moldable material may initially be deposited in liquid form and/or semi-liquid form to easily fill and conform to the interior chamber. Thereafter, the moldable material may be configured to solidify via curing to form the molded block. In some embodiments, the moldable material may expand after it is deposited prior to curing such that it more fully fills the interior chamber. In some embodiments, the moldable material includes polyurethane. In some embodiments, the moldable material includes polystyrene, latex, plant fibers (e.g., cellulose), concrete, and/or additional moldable materials as would be apparent to a person having an ordinary level of skill in the art The method 500 further includes shifting 520 the construction apparatus to an open configuration. For example, the construction apparatus may be opened by separating the shells using a separation device 190 as described herein. In another example, the shells may be manually separated. In embodiments using an extraction mechanism 200, the molded block 10 may be lifted with the first shell piece and thereby separated from the second shell piece.

The method 500 further includes extracting 525 the molded block from the first shell piece and/or the second shell piece (i.e., the remaining shells to which the molded block is still affixed). For example, the molded block may be separated from the first shell piece manually and/or using the extraction mechanism 200. The method further includes removing 530 the extraction pins as described herein from the molded block.

In some embodiments, the extraction mechanism 200 may cause the molded block 10 to be separated from the first shell piece when shifting 520 the construction apparatus to the open configuration. In such embodiments, extracting 525 the molded block from the upper and/or second shell piece(s) may include removing the molded block from the second shell piece.

In some embodiments, the construction apparatus may include movable cores as described herein. In such embodiments, shifting 520 the construction apparatus to the open configuration may include lifting the molded block and one or more cores and successively releasing the molded block from each of the one or more cores.

In some embodiments, the moldable material may be injected 510 within the interior chamber through a nozzle. However, the moldable material may be introduced to the interior chamber in a variety of manners as would be apparent to a person having an ordinary level of skill in the art.

Figure 6:
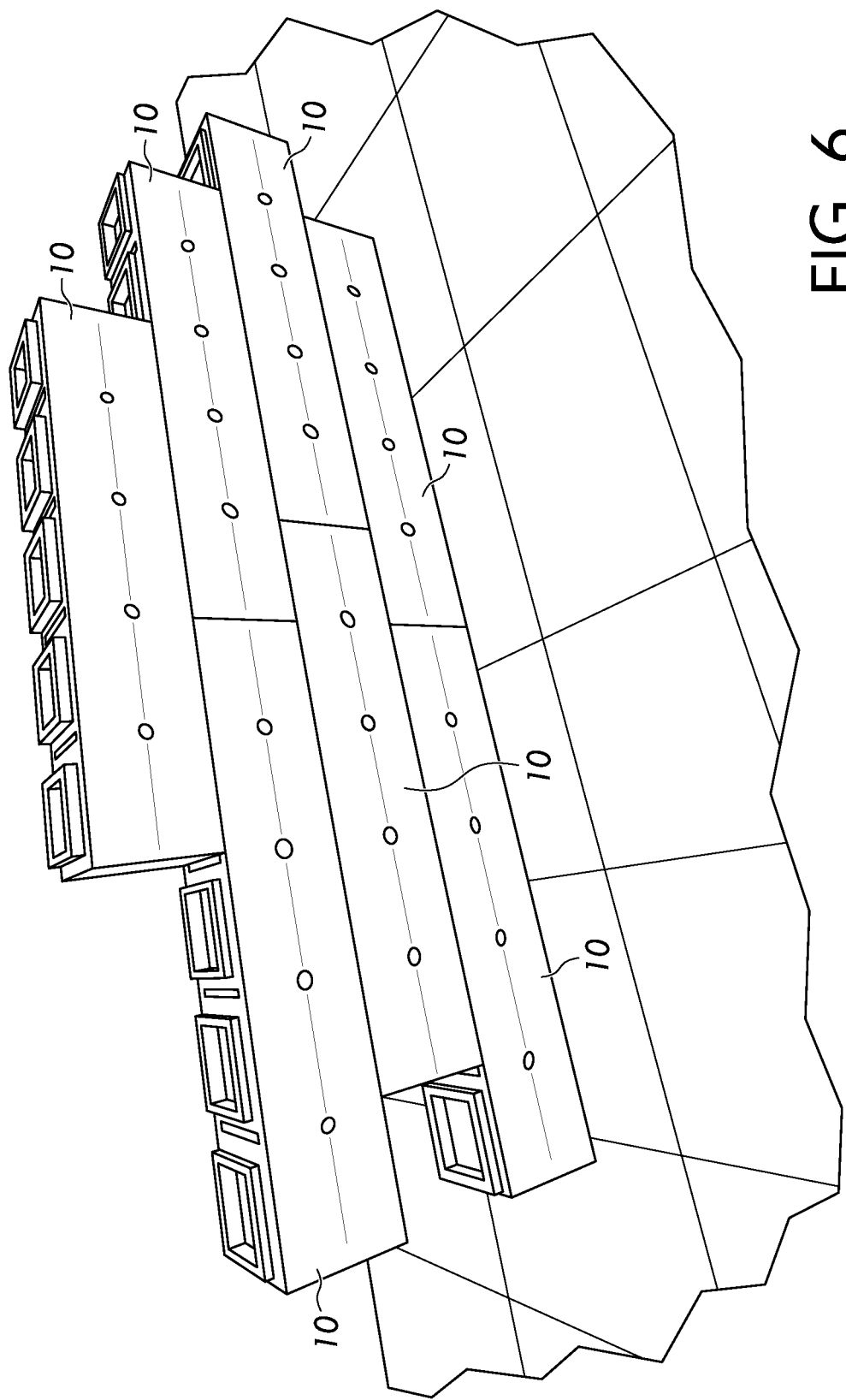
FIG. 6 depicts a structure formed with a plurality of molded blocks in accordance with one or more embodiments shown and described herein.

A modular construction component for building structures is also provided. As shown in FIGS. 3-4, the molded block 10 may be formed by a construction apparatus (e.g., construction apparatus 100). In some embodiments, the molded block 10 includes one or more repeating units that are shaped by the shells of the construction apparatus. The repeating units may include raised surfaces 14 surrounding a void 16 as depicted in FIGS. 3-4. In some embodiments, the repeating units generally correspond to and may be formed by the cores and the corresponding surfaces of the upper and second shell pieces of the construction apparatus as described and depicted. In some embodiments, the repeating units may include mating surfaces that allow the molded block 10 to be coupled to complementary mating surfaces of another molded block 10 to build a structure using a plurality of repeating units. For example, the raised surfaces 14 on a top the molded block 10 may be mated with an opening in a bottom surface of another molded block 10, e.g., the bottom end of the void 16. In some embodiments, the raised surfaces 14 and the void 16 may be sized and configured to mate and secure the molded blocks 10 to one another. For example, the raised surface 14 and the void 16 may interlock and secure to one another by interference fit. Accordingly, a plurality of molded blocks 10 may be nested and arranged to form a structure. For example, FIG. 6 depicts a structure formed with a plurality of molded blocks 10 in accordance with an embodiment. In some embodiments, the molded block 10 includes horizontally extending channels resulting from the use of extraction pins as described herein and their subsequent removal. In some embodiments, the molded block 10 includes one or more grooves or recesses because of the use of fins within the interior chamber as described herein. The grooves or recesses may reduce the overall weight of the molded block 10 without compromising the strength of the molded block 10. Further, the grooves or recesses may reduce the amount of moldable material required to form the molded block 10. It should be understood that any of the various embodiments of the construction apparatus and the methods of use as described herein may be applied in forming the molded block 10, thereby resulting in corresponding features or characteristics being present in the formed molded block 10.

As should be understood in view of the foregoing, a construction apparatus for forming modular construction components is disclosed. The construction apparatus comprises a first shell piece and a second shell piece that define an interior chamber defining a space for receiving a moldable material. The first shell piece may include a body, a top, and upper side walls, while the second shell piece may include a body, a base, and lower side walls. The first shell piece may further include a lower surface corresponding to a bottom edge of the upper side walls, while the second shell piece may include an upper surface corresponding to an upper edge of the lower side walls. The construction apparatus further comprises a separation device to move the first shell piece and the second shell piece from a closed configuration to an open configuration. In the closed configuration, the lower surface of the first shell piece and the upper surface of the second shell piece may lie flush together, and a seal may be created between the two surfaces. In this configuration, the interior chamber may be filled with the moldable material and the moldable material may be cured, with the seal between the upper surface and lower surface helping to ensure that moldable material does not leak from the interior chamber. The construction apparatus further comprises one or more cores within the interior chamber, one or more pins extending within the interior chamber, and one or more retaining plates for retaining the pins on the first shell piece. The cores may be configured to create voids within the molded blocks. Similarly, the pins may be placed through the retaining plates prior to the interior chamber being filled with moldable material, such that the molded block is cured around the pins. Once the molded block has cured, the construction apparatus may be shifted to the open configuration by the separation device, and the cores may be moved in a vertical direction along with the molded block to extract the molded block from the first and/or second shell piece. Similarly, the pins and retaining plates may be moved in a vertical direction along with the molded block when the separation device is shifted to the open configuration, such that the pins may be used to extract the molded block from the first shell piece and/or second shell piece.

In the above detailed description, reference is made to the accompanying drawings, which form a part hereof. In the drawings, similar symbols typically identify similar components, unless context dictates otherwise. The illustrative embodiments described in the present disclosure are not meant to be limiting. Other embodiments may be used, and other changes may be made, without departing from the spirit or scope of the subject matter presented herein. It will be readily understood that various features of the present disclosure, as generally described herein, and illustrated in the Figures, can be arranged, substituted, combined, separated, and designed in a wide variety of different configurations, all of which are explicitly contemplated herein.

This disclosure is not limited to the particular systems, devices and methods described, as these may vary. The terminology used in the description is for the purpose of describing the particular versions or embodiments only, and is not intended to limit the scope. Such features of the disclosure be embodied in many different forms; rather, these embodiments are provided so that this disclosure will be thorough and complete, and will fully convey its scope to those skilled in the art.

As used in this document, the singular forms "a," "an," and "the" include plural references unless the context clearly dictates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As will be understood by one skilled in the art, for any and all purposes, such as in terms of providing a written description, all ranges disclosed herein are intended as encompassing each intervening value between the upper and lower limit of that range and any other stated or intervening value in that stated range. All ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells as well as the range of values greater than or equal to 1 cell and less than or equal to 3 cells. Similarly, a group having 1-5 cells refers to groups having 1, 2, 3, 4, or 5 cells, as well as the range of values greater than or equal to 1 cell and less than or equal to 5 cells, and so forth.

In addition, even if a specific number is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, sample embodiments, or drawings, should be understood to contemplate the possibilities of including one of the terms, either of the terms, or both terms. For example, the phrase "A or B" will be understood to include the possibilities of "A" or "B" or "A and B."

The term "about," as used herein, refers to variations in a numerical quantity that can occur, for example, through measuring or handling procedures in the real world; through inadvertent error in these procedures; through differences in the manufacture, source, or purity of compositions or reagents; and the like. Typically, the term "about" as used herein means greater or lesser than the value or range of values stated by $\frac{1}{10}$ of the stated values, e.g., ±10%. The term "about" also refers to variations that would be recognized by one skilled in the art as being equivalent so long as such variations do not encompass known values practiced by the prior art. Each value or range of values preceded by the term "about" is also intended to encompass the embodiment of the stated absolute value or range of values. Whether or not modified by the term "about," quantitative values recited in the present disclosure include equivalents to the recited values, e.g., variations in the numerical quantity of such values that can occur, but would be recognized to be equivalents by a person skilled in the art. Where the context of the disclosure indicates otherwise, or is inconsistent with such an interpretation, the above-stated interpretation may be modified as would be readily apparent to a person skilled in the art. For example, in a list of numerical values such as "about 49, about 50, about 55, "about 50" means a range extending to less than half the interval(s) between the preceding and subsequent values, e.g., more than 49.5 to less than 52.5. Furthermore, the phrases "less than about" a value or "greater than about" a value should be understood in view of the definition of the term "about" provided herein.

It will be understood by those within the art that, in general, terms used herein are generally intended as "open" terms (for example, the term "including" should be interpreted as "including but not limited to," the term "having" should be interpreted as "having at least," the term "includes" should be interpreted as "includes but is not limited to," et cetera). Further, the transitional term "comprising," which is synonymous with "including," "containing," or "characterized by," is inclusive or open-ended and does not exclude additional, unrecited elements or method steps. While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

By hereby reserving the right to proviso out or exclude any individual members of any such group, including any sub-ranges or combinations of sub-ranges within the group, that can be claimed according to a range or in any similar manner, less than the full measure of this disclosure can be claimed for any reason. Further, by hereby reserving the right to proviso out or exclude any individual substituents, structures, or groups thereof, or any members of a claimed group, less than the full measure of this disclosure can be claimed for any reason. Throughout this disclosure, various patents, patent applications and publications are referenced. The disclosures of these patents, patent applications and publications are incorporated into this disclosure by reference in their entireties in order to more fully describe the state of the art as known to those skilled therein as of the date of this disclosure. This disclosure will govern in the instance that there is any inconsistency between the patents, patent applications and publications cited and this disclosure.

Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

The present disclosure is not to be limited in terms of the particular embodiments described in this application, which are intended as illustrations of various features. Instead, this application is intended to cover any variations, uses, or adaptations of the present teachings and use its general principles. Further, this application is intended to cover such departures from the present disclosure as come within known or customary practice in the art to which these teachings pertain. Many modifications and variations can be made to the particular embodiments described without departing from the spirit and scope of the present disclosure, as will be apparent to those skilled in the art. Functionally equivalent methods and apparatuses within the scope of the disclosure, in addition to those enumerated herein, will be apparent to those skilled in the art from the foregoing descriptions. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A construction apparatus comprising:
   a first shell piece and a second shell piece configured to move with respect to one another between an open configuration and a closed configuration;
   an interior chamber defined by the first shell piece and second shell piece, the interior chamber defining a space for receiving a moldable material;
   a rod coupled to a base of the second shell piece, the rod defining a length with an upper end extending toward the first shell piece, the rod comprising a stopper positioned proximal to the upper end;
   a core coupled to the rod at the upper end thereof, the core comprising a sleeve portion surrounding the rod such that the core is configured to slide along the length of the rod and is prevented from sliding off the rod by the stopper;
   a sealing mechanism forming a seal between the first shell piece and the second shell piece in the closed configuration; and
   a separation mechanism having at least one jack moving the first shell piece and the second shell piece between the open configuration and the closed configuration;
   wherein the moldable material is formed into a molded block defined by the interior chamber.

2. The construction apparatus of claim 1, wherein the core is positioned to form a void in the molded block.

3. The construction apparatus of claim 1, wherein the core is a hollow core.

4. The construction apparatus of claim 1, wherein the first and/or second shell piece defines an aperture open to an external environment to facilitate heat transfer from the core in the interior chamber to the external environment.

5. The construction apparatus of claim 1, wherein the sealing mechanism creates a fluid-tight seal between the first shell piece and the second shell piece to prevent the moldable material from leaking from the interior chamber.

6. The construction apparatus of claim 1, wherein the second shell piece comprises at least one protrusion and the first shell piece comprises at least one hole, the at least one hole being configured to receive the at least one protrusion when the first shell piece and second shell piece are in the closed configuration.

7. The construction apparatus of claim 1, further comprising a plurality of cores coupled to a plurality of rods at a proximal end thereof, the plurality of rods extending from the base of the second shell piece.

8. The construction apparatus of claim 7, wherein each of the plurality of rods comprise a spacer configured to limit a distance the plurality of cores slide between the base of the second shell piece and the stoppers.

9. The construction apparatus of claim 8, wherein a distance between the spacer and the stopper is a different distance on each of the plurality of rods.

10. The construction apparatus of claim 9, wherein the different distance between the spacer and the stopper on each of the plurality of rods allows the plurality of cores to be forced apart from the molded block in succession.

11. The apparatus of claim 1, wherein the first shell piece further comprises at least one pin and at least one retaining plate, the at least one retaining plate having at least one slot for receiving the pin.

12. The apparatus of claim 11, wherein the at least one pin extends through the interior chamber such that the moldable material forms the molded block with the at least one pin extending through the molded block.

13. The apparatus of claim 1, wherein at least one of the first shell piece or the second shell piece comprises a plurality of fins extending inwardly within the interior chamber.

14. The apparatus of claim 1, further comprising a base having at least one wheel.

15. A method of using a construction apparatus, comprising:
   positioning an first shell piece and a second shell piece of the construction apparatus in a closed configuration such that the first shell piece and the second shell piece define an interior chamber, the construction apparatus further comprising:
      a rod coupled to a base of the second shell piece, the rod defining a length with an upper end extending toward the first shell piece, the rod comprising a stopper positioned proximal to the upper end, and
      a core coupled to the rod at the upper end thereof, the core comprising a sleeve portion surrounding the rod such that the core is configured to slide along the length of the rod and is prevented from sliding off the rod by the stopper;
   creating a fluid-tight seal at a contact area between the first shell piece and the second shell piece using a sealing mechanism of the construction apparatus;
   injecting moldable material into the interior chamber defined by the first shell piece and the second shell piece;
   curing the moldable material within the interior chamber to form a molded block;
   shifting the first shell piece and the second shell piece to an open configuration using a separation mechanism having at least one jack of the construction apparatus; and
   extracting the molded block from the first shell piece and the second shell piece.

16. The method of claim 15, wherein the construction apparatus further comprises a plurality of cores which adhere to the moldable material, such that shifting the first shell piece and the second shell piece to the open configuration further involves lifting the molded block and the plurality of cores and extracting the molded block from the first shell piece and second shell piece further involves releasing the molded block from the plurality of cores.

17. The method of claim 15, wherein the first shell piece includes at least one pin extending through the interior chamber, such that the moldable material forms the molded block with the at least one pin extending through the molded block and extracting the molded block from the first shell piece and the second shell piece further involves removing the at least one pin from the molded block.

18. The method of claim 15, wherein the moldable material is configured to expand after being injected into the interior chamber, such that the moldable material completely fills the interior chamber.

* * * * *